(12) United States Patent
Sugiyama et al.

(10) Patent No.: US 7,657,335 B2
(45) Date of Patent: Feb. 2, 2010

(54) DIGITAL AUDIO SIGNAL REPRODUCING APPARATUS

(75) Inventors: Tadashi Sugiyama, Hamamatsu (JP); Toshifumi Oba, Toyohashi (JP)

(73) Assignee: Yamaha Corporation, Hamamatsu-shi (JP)

( * ) Notice: Subject to any disclaimer, the term of this patent is extended or adjusted under 35 U.S.C. 154(b) by 970 days.

(21) Appl. No.: 10/207,488

(22) Filed: Jul. 29, 2002

(65) Prior Publication Data
US 2003/0023332 A1   Jan. 30, 2003

(30) Foreign Application Priority Data
Jul. 30, 2001 (JP) ............... 2001-230160
May 28, 2002 (JP) ............... 2002-154252

(51) Int. Cl.
*G09F 17/00* (2006.01)
(52) U.S. Cl. ...................................................... 700/94
(58) Field of Classification Search ................. 700/94; 381/119; 369/1–12
See application file for complete search history.

(56) References Cited

U.S. PATENT DOCUMENTS 5,511,000 A * 4/1996 Kaloi et al. ................. 704/201
6,332,175 B1 * 12/2001 Birrell et al. ................. 711/112
6,993,081 B1 * 1/2006 Brunheroto et al. ..... 375/240.28
2001/0044664 A1 * 11/2001 Mueller et al. ................. 700/94

FOREIGN PATENT DOCUMENTS

| JP | 62-293566 | 12/1987 |
| JP | 7-23491 | 1/1995 |
| JP | 8-255430 | 1/1996 |
| JP | 11-073734 | 3/1999 |
| JP | 11-306666 | 3/1999 |
| JP | 2000-200465 | 7/2000 |
| JP | 2001-160266 | 6/2001 |

OTHER PUBLICATIONS

Notice of Reason for Refusal issued on Japanese Patent Application No. 2002-154252 with its English translation.

* cited by examiner

*Primary Examiner*—Andrew C Flanders
(74) *Attorney, Agent, or Firm*—Pillsbury Winthrop Shaw Pittman LLP

(57) ABSTRACT

When an emphasis setting of a next track is different from that of a current track, a silent signal having the emphasis setting of the next track written in its subcode information is output for a predetermined time prior to reproduction of the next track. The emphasis setting is changed for the next track while the silent signal is being output, so that the next track can be reproduced appropriately without involving an unwanted lack in its leading portion.

8 Claims, 5 Drawing Sheets

DIGITAL AUDIO SIGNAL REPRODUCING APPARATUS

BACKGROUND OF THE INVENTION

The present invention relates to digital audio signal reproducing apparatus for successively reproducing audio signals of a plurality of tracks.

The digital audio amplifier has been in practical use which receives a digital audio signal directly as they are, processes the received digital audio signal via a DSP (Digital Signal Processor), converts the thus-processed signal into analog representation and then amplifies and outputs the analog signal. Because such a digital audio amplifier is digitally connected to a digital audio signal reproducing apparatus, it can reliably prevent a possibility of undesired signal deterioration such as introduction of noise into the signal. In addition, there is no need to repeat A/D and DA conversion operations when signal processing is carried out within the amplifier via digital circuitry such as DSP circuitry, and thus the digital audio amplifier can also advantageously avoid signal deterioration that would result from the repeated A/D and DA conversion operations.

Digital audio signals are recorded on a plurality of tracks with characteristics corresponding to their respective sources, which means that all the audio signals are not recorded with same recording characteristics. For example, such recording characteristics relate to an ON/OFF setting of emphasis, sampling rate, etc. of the audio signal.

With the traditional analog amplifier, it is not necessary at all to take into account the above-mentioned characteristics of digital recording because analog signals having been converted in advance from digital form are input to the amplifier. However, with the digital audio amplifier, where digital audio signals recorded with various recording characteristics are input directly as they are, there arises a need to process the input signals using processing settings that correspond to the recording characteristics of the signals. Thus, when a variation in any one of the recording characteristics occurs between successive input digital audio signals, i.e. when a newly-reproduced track has a different recording characteristic from a last-reproduced track, the settings of the processing circuitry, such as DSP circuitry, must be changed accordingly, which would take a time in the order of 200-500 msec.

Thus, the ordinary-type digital audio amplifier is arranged in such a manner that, when some variation in any of the recording characteristics occurs between successive input digital audio signals, it mutes the output audio signals during the time necessary for changing the settings of the processing circuitry (200-500 msec.) and thereby prevents noise, produced due to the setting-changing operations, from being audibly output through a speaker.

However, because a digital audio signal reproducing apparatus, which is a digital audio signal supply source, is connected with the digital audio amplifier only via a digital audio line such as an optical fiber or coaxial cable, the reproducing apparatus can not identify states of the digital audio amplifier. Thus, even when the digital audio signal reproducing apparatus is muting the output, it keeps reproducing and delivering a digital audio signal to the digital audio amplifier. As a consequence, when tracks of different settings are reproduced, they tend to lack signals of their leading or head portions.

Although it is generally rare that a single audio CD mixedly includes tracks of different recording characteristics, such mixed inclusion of tracks of different recording characteristics may often present the above-discussed inconvenience in cases where a plurality of tracks extracted from a plurality of sources are combined into a single audio CD.

SUMMARY OF THE INVENTION

In view of the foregoing, it is an object of the present invention to provide a digital audio signal reproducing apparatus which, even when a variation in any one of predetermined recording characteristics such as emphasis occurs, can appropriately reproduce and output an audio signal in such a manner as to avoid an undesired lack in a leading portion of the signal on an amplifier side.

According to a first aspect of the present invention, there is provided an improved digital audio signal reproducing apparatus, which comprises: a storage device storing a plurality of digital audio files and characteristic information indicative of recording characteristics of individual ones of the digital audio files; and a control device that successively reads out the plurality of digital audio files and outputs the read-out digital audio files as digital audio signals. When, after completion of output of a first digital audio signal corresponding to a first recording characteristic, shifting to output of a second digital audio signal corresponding to a second recording characteristic different from the first recording characteristic, the control device outputs, for a predetermined time, a third digital audio signal having the second recording characteristic, based on second characteristic information, ahead of the second digital audio signal, and then the control device starts outputting the second digital audio signal corresponding to the second recording characteristic after having outputted the third digital audio signal for the predetermined time.

According to a second aspect of the present invention, there is provided an improved digital audio signal reproducing apparatus, which comprises: a storage device storing a digital audio file and characteristic information indicative of a recording characteristic of the digital audio file; and a control device that reads out the digital audio file and outputs the read-out digital audio file as a first digital audio signal. When the recording characteristic of the first digital audio signal is different from a predetermined recording characteristic, the control device outputs, for a predetermined time, a second digital audio signal, having the recording characteristic of the first digital audio signal, ahead of the first digital audio signal, and starts outputting the first digital audio signal after having outputted the second digital audio signal for the predetermined time.

The digital audio signal reproducing apparatus of the present invention is characterized primarily in that, to output a given recording characteristic, it first outputs a silent digital audio signal having the given recording characteristic written therein as channel status information. The recording characteristic relates to at least one of an ON/OFF (presence/absence) state of emphasis to be imparted to a digital audio signal and a sampling rate of the digital audio signal.

Generally, digital audio amplifiers and the like, which receive a digital audio signal and perform processing on the received or input digital audio signal, have to identify the recording characteristics, such as emphasis and sampling rate, of the input digital audio signal, and adjust settings of their processing circuit section in accordance with the identified recording characteristics. For example, when a plurality of digital audio files are to be reproduced in succession and a pair of preceding and succeeding digital audio files differ in any one of the recording characteristics, or when a digital audio file of recording characteristics that do not match default settings, i.e. most common settings, there arises a need to change the settings of the processing circuit section, which requires a time in the order of 200-500 msec. Thus, before outputting a digital audio signal, representative of a given digital audio file, having a particular recording characteristic different from the counterpart of a preceding digital audio signal (file) or failing to match the corresponding default setting, the digital audio signal reproducing apparatus of the present invention outputs a silent digital audio signal having the particular recording characteristic written therein as channel status information. With such an arrangement, a digital audio amplifier or the like, having received the particular recording characteristic, can change the setting of its processing circuit section in accordance with the received particular recording characteristic before the digital audio signal having the particular recording characteristic is supplied to the amplifier or the like. In this manner, the present invention can appropriately reproduce digital audio files of various recording characteristics without involving an unwanted lack in their leading head portions.

Note that the terms "digital audio file" used in the context of the present invention are intended to embrace tracks of the CD-DA standard, DAT standard, DVD standard, etc. as well as a WAV file.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

Figure 1:
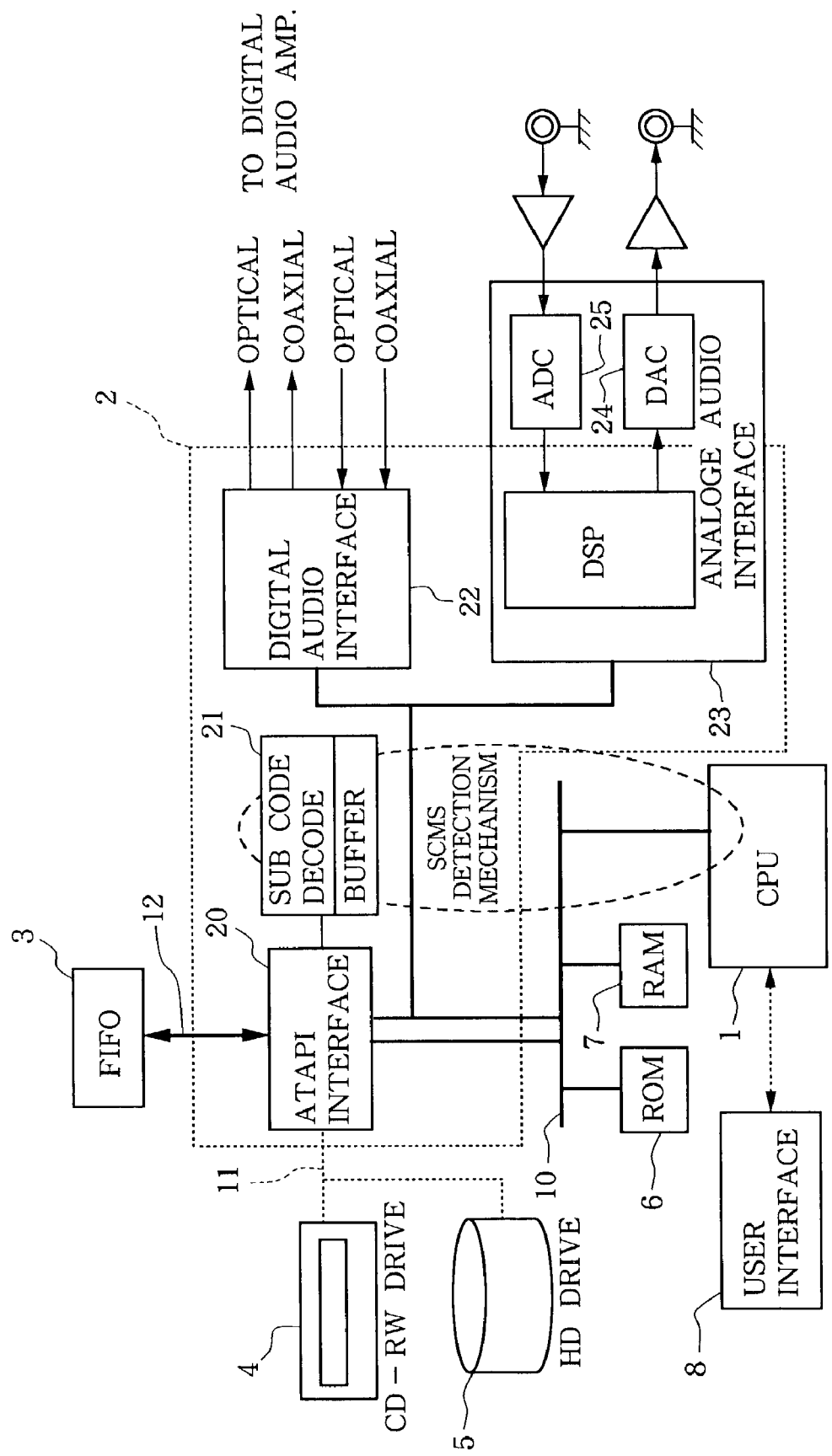
FIG. 1 is a block diagram of a digital audio signal recording/reproducing apparatus in accordance with an embodiment of the present invention.

FIG. 1 is a block diagram of a digital audio signal recording/reproducing apparatus in accordance with an embodiment of the present invention. In the instant embodiment, the terms "audio signal" refer to a digital audio signal unless specified otherwise. The digital audio signal recording/reproducing apparatus of FIG. 1 includes a CD drive 4 and a hard disk drive 5, and various types of signals, not only of the CD-DA (Compact Disk-Digital Audio) standard but also of the DAT (Digital Audio Tape) standard and DVD (Digital Versatile Disk) standard, can be processed by this recording/reproducing apparatus. In the following description of the instant embodiment, the terms "track", "music piece" and "audio file" are used practically interchangeably, i.e. as substantial synonyms.

More specifically, the digital audio signal recording/reproducing apparatus of FIG. 1 includes, in addition to the CD drive 4 and hard disk drive (hard disk) 5, a digital audio interface 22 and an analog audio interface 23. Thus, the recording/reproducing apparatus can record, onto the hard disk 5, an audio signal reproduced via the CD drive 4 or audio signals input via the digital audio interface 22 or analog audio interface 23. Also, the recording/reproducing apparatus can record, directly onto a CD-R (or CD-RW) disk set in the CD drive 4, an audio signal read out from the hard disk 5 or audio signal input via the digital audio interface 22 or analog audio interface 23.

In reproduction, the recording/reproducing apparatus can output a track read out from an audio CD by the CD drive 4 or an audio file read out from the hard disk 5, via the digital audio interface 22, as stream data. Also, the recording/reproducing apparatus can output such a track or audio file as an analog audio signal via the analog audio interface 23, after internally converting the track or audio file into analog representation.

The audio CD (where are recorded audio signals of the CD-DA standard) set in the CD drive 4 and the hard disk 5 each have a plurality of tracks or audio files, which can be reproduced in a successive manner.

The digital audio interface 22 is capable of inputting/outputting a digital audio signal, compliant with the IEC60958 standard, delivered from a CD player, DAT recorder, DVD player or the like, and the signal input via the digital audio interface 22 is converted into a file format and recorded onto the hard disk 5 by a controller 2. When the thus-recorded file is, to be read out for reproduction, the controller 2 converts the recorded file back to the IEC60958-compliant digital audio signal and then outputs the converted digital audio signal directly via the digital audio interface 22 or after converting it into analog representation.

The digital audio signal compliant with the IEC60958 standard has management information attached thereto, and this management information includes characteristic information indicating a particular type of signal supply device from which the digital audio signal was supplied and particular recording characteristics with which the digital audio signal was recorded. The digital audio signal recording/reproducing apparatus of FIG. 1 records the recording characteristics too when recording the input or supplied digital audio signal. When the digital audio signal is to be output from the recording/reproducing apparatus as audible tones, the digital audio signal can not be output with desirable tone quality unless it undergoes signal processing that fits the recording characteristics of the audio signal. Signal processing sections for performing such signal processing are included in the analog audio interface 23 of the digital audio signal recording/reproducing apparatus, as well as in a digital audio amplifier connected to the digital audio interface 22. Note that the "recording characteristics" include, for example, characteristics of an emphasis setting, sampling rate, etc. In the case of the audio CD, such recording characteristics are recorded as "subcode information", and when a CD player or the like outputs the digital audio signal, the recording characteristics are not only output as the subcode information but also reflected in channel status information as will be later described.

Where a plurality of tracks are to be reproduced successively, and when the last-reproduced track and the track to be currently reproduced (i.e., new track) differ from each other in any one of the predetermined recording characteristics, settings of the signal processing sections have to be changed in accordance with the recording characteristics of the new track, which will normally take a time in the order of 200-500 msec. Therefore, when the new track differ in any one of the recording characteristics from the last-reproduced track, the digital audio signal recording/reproducing apparatus of FIG.

1 generates and outputs a "dummy" audio signal, having the recording characteristics of the new track written in its channel status information, for a predetermined time before outputting the audio signal of the new track; that is, the recording/reproducing apparatus starts outputting the audio signal of the new track after the output, for the predetermined time, of the dummy audio signal. The predetermined time may be set to be substantially equal to the time necessary for completing the setting changes in the signal processing sections; normally, the predetermined time is in the range of 500 msec. to 1 sec. In this way, the signal processing circuits for outputting the audio signal after performing predetermined signal processing and D/A conversion can properly complete the necessary setting changes while the dummy audio signal is being input thereto; thus, when the audio signal of the to-be-currently reproduced track (new track) is received, the signal processing circuits can appropriately perform the predetermined signal processing and D/A conversion on the received audio signal, using the changed or new settings, to thereby output a suitable analog audio signal from the reproducing apparatus.

As also seen in the block diagram of FIG. 1, the controller 2, which controls the input/output of an audio signal, includes an ATAPI interface 20, a subcode detection section 21, the digital audio interface 22 and the analog audio interface 23. To the ATAPI interface 20 are connected, via an ATAPI bus 11, the CD drive 4 and hard disk drive 5. Also, a FIFO memory 3 is connected via a memory bus 12 to the ATAPI interface 20, and a CPU 1 is also connected via a CPU bus 10 to the ATAPI interface 20. Further, a ROM 6 and RAM 7, in addition to the CPU 1 and controller 2, are connected to the CPU bus 10, and a user interface 8 is connected to the CPU 1.

The controller 2 is implemented by, for example, a dedicated LSI. The controller 2 is capable of controlling data readout from an audio CD set in the CD drive 4, data write to a CD-R disk set in the CD drive 4, data write and readout on the hard disk 5, and audio signal input/output from/to external equipment.

The digital audio interface 22 of the controller 2 includes input terminals for connection with an optical fiber and coaxial cable, and output terminals for connection with an optical fiber and coaxial cable. Digital audio signal is output to a digital audio amplifier via the output terminal; the thus-output digital audio signal is compliant with the IEC 60958 standard. Further, the analog audio interface 23 includes an input A/D converter 25, an output D/A converter 24, and a DSP 26 for performing signal processing such as equalizing.

The subcode detection section 21 of the controller 2 separates the subcode information from data of an input track or from data read out via the CD drive 4 and decodes the thus-separated subcode information, to thereby read out a track number, emphasis information, sampling rate, etc. The subcode detection section 21 includes a buffer for temporarily storing the subcode information so that it transfers the decoded information to the CPU 1. The digital audio interface 22 reads, from the channel status information of each input digital audio signal, information of the audio signal supply device, emphasis information, sampling rate, etc. These items of information are read out by the CPU 1. Further, on the hard disk 5, audio files are stored in a specific format different from those specified by storage media standards such as the CD-DA standard, DAT standard and DVD standard, and the management information corresponding to the subcode information is stored separately from the audio files.

Figure 3:
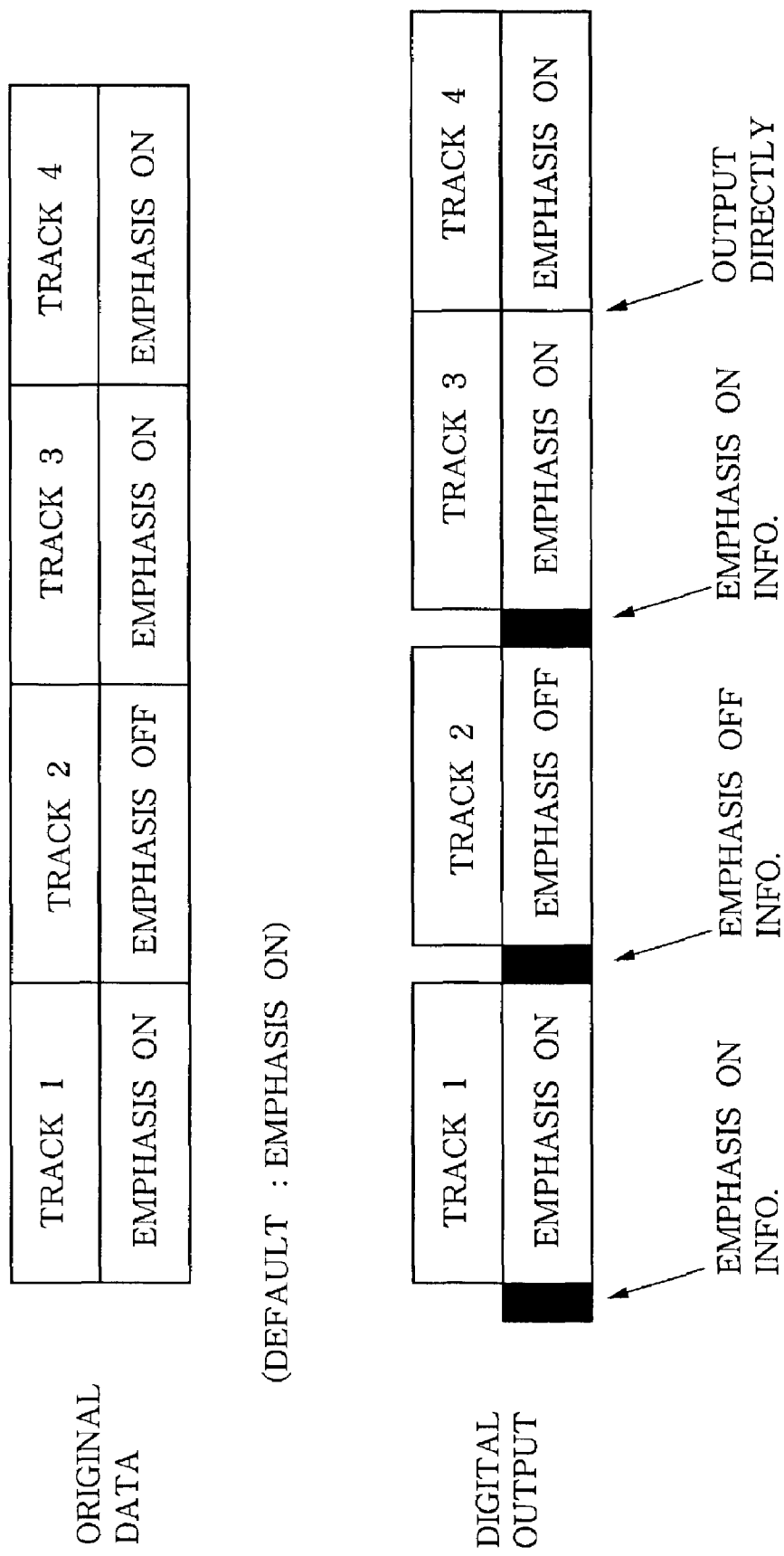
FIG. 3 is a diagram explanatory of an exemplary manner in which a plurality of tracks are reproduced in the embodiment.

When an audio file is to be reproduced from the hard disk 5, the controller 2 synthesizes the audio data and management information read out from the hard disk 5, so as to convert the audio file into stream data compliant with the IEC60958 standard. Further, where a plurality of audio files are to be reproduced successively, and when the last-reproduced audio file and the audio file to be currently reproduced (i.e., new audio file) differ from each other in any one of the recording characteristics such as the emphasis setting, the controller 2 generates and outputs a dummy audio signal for a predetermined time before outputting the audio signal of the new audio file and then outputs the audio signal of the new audio file (see "track 2" and "track 3" of FIG. 3). The dummy audio signal is a silent audio signal having channel status information in which is written the same recording characteristics as in the audio signal of the new audio file, and has a time length or duration in the order of 500 msec.-1 sec. The operation for outputting such a dummy audio signal is performed not only in the case where a plurality of tracks are to be read out successively from the audio CD set in the CD drive 4 but also in the case where tracks of the audio CD and audio files of the hard disk 5 are to be successively read out in a combined fashion, when a variation in any one of the recording characteristics occurs.

Further, even where only one track is to be reproduced, or even for a leading track in the case where a plurality of tracks are to be reproduced successively, a dummy audio signal is generated and output prior to output of the audio signal of the track in question (see "track 1" of FIG. 3), as long as the track in question has a recording characteristic different from the corresponding one of the default settings of an audio signal processing section of the digital audio amplifier or other device to which the audio signal of that track is to be ultimately output; the default settings of the audio signal processing section are, for example, settings indicative of "no emphasis" and "sampling rate of 44.1 kHz".

Figure 2:
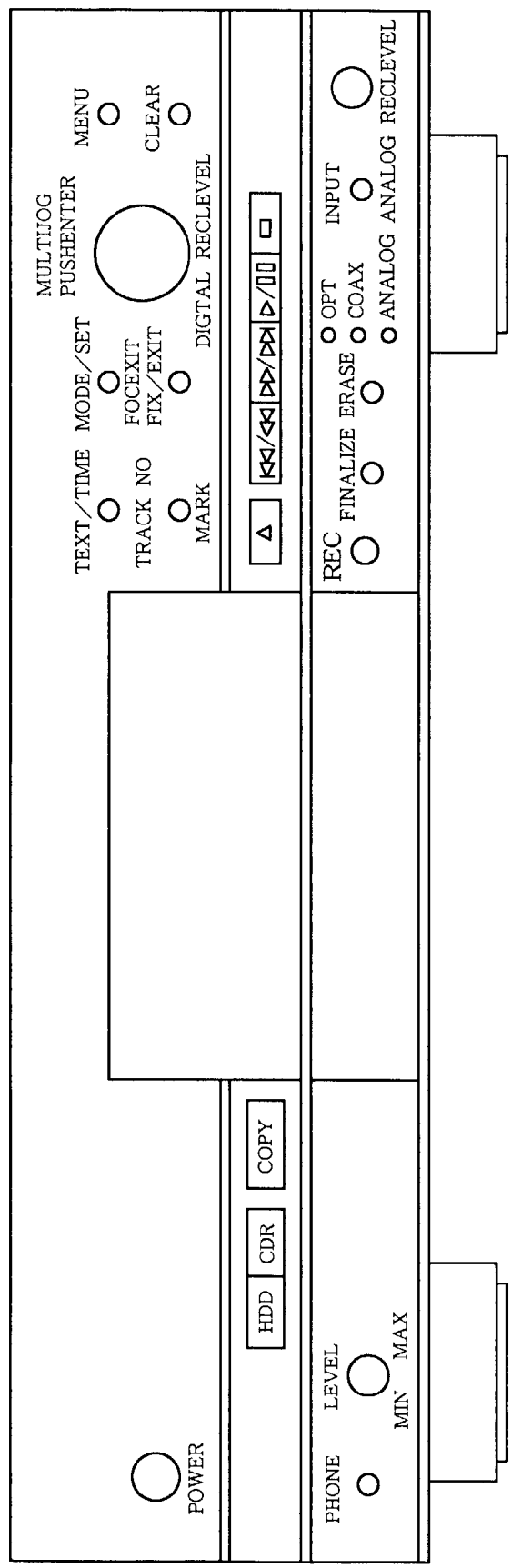
FIG. 2 is an external view of the digital audio signal recording/reproducing apparatus shown in FIG. 1.

The user interface 8 includes various operators and a display section provided on an operation panel surface shown in FIG. 2. The various operators include a group of switches such as a play button and stop button in a similar manner to the conventional CD player, a multi-functional jog dial for the user to select a desired disk or track. Further, the display section displays a selected or currently-reproduced track number.

The CD drive 4 is a so-called CD-RW drive, which can not only read out recorded audio data of an audio CD set therein but also write audio data onto a write-once CD-R disk or rewritable CD-RW disk. Hereinafter, the CD-R and CD-RW disks will be generically called "CD-R disks". The hard disk 5 has a storage capacity of about 20 GB and can cumulatively store data of 30 to 40 audio CDs; however, the hard disk 5 may be of any other suitable storage capacity.

Note that other drives than the CD drive 4 and hard disk drive 5, such as any one or more of DVD-ROM, DVD-R, DVD-RAM and PD drives, may be connected to the ATAPI interface 20. Further, arrangements may be made such that any one of the drives connected to the ATAPI interface 20 can be replaced with another desired drive through simple replacing operation.

Figure 4:
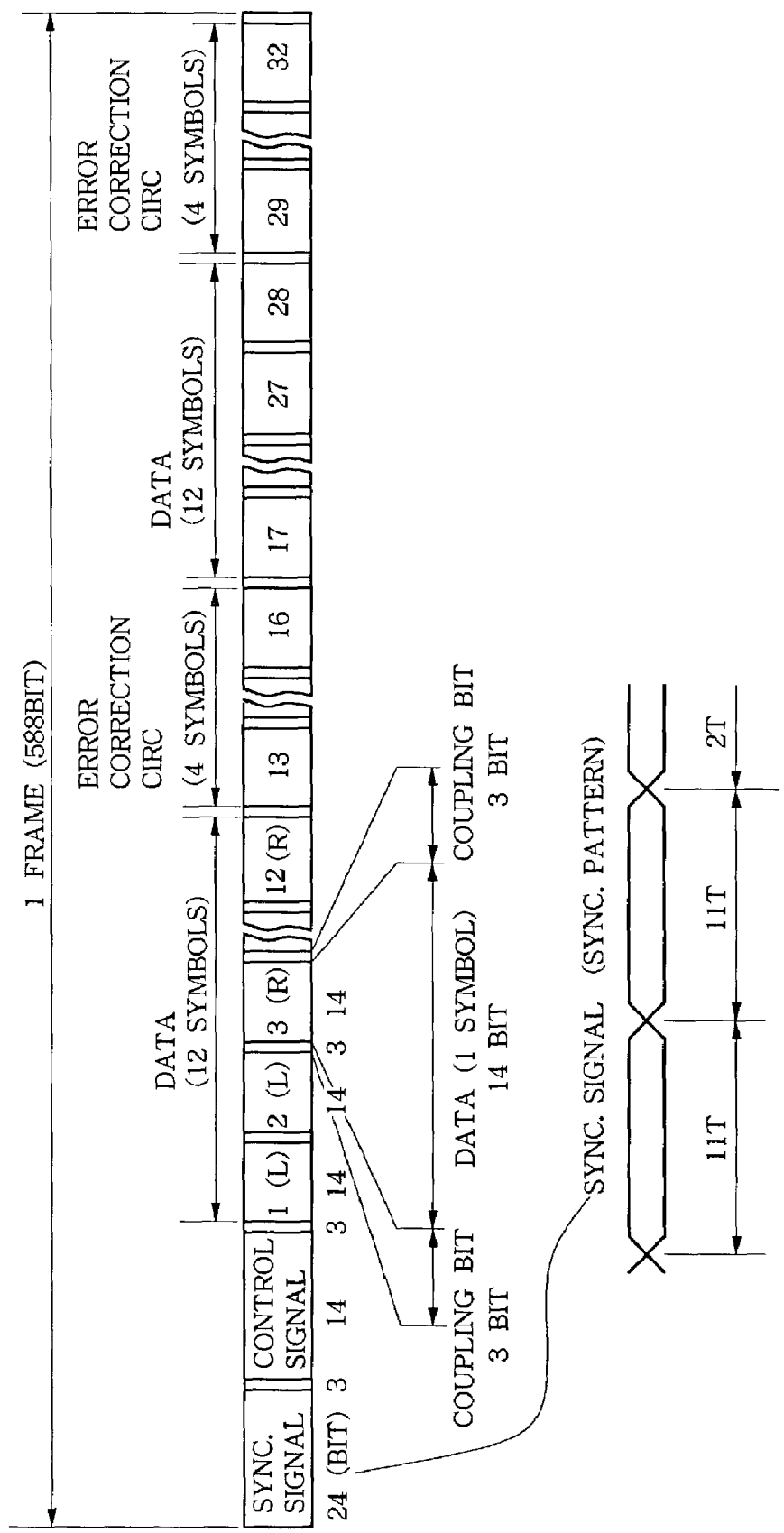
FIG. 4 is a diagram showing an exemplary format of a digital audio signal.

The following paragraphs describe the CD-DA standard that defines a storage format of audio CDs, with reference to FIG. 4. According to the CD-DA standard, an audio signal is converted into digital sample data at a sampling frequency of 44.1 kHz using a two-channel 16-bit quantization scheme, and then these sample data are formed into a frame with every six samples imparted with CIRC-based parity; namely, one frame is composed of 32 symbols imparted with CIRC-based parity, which corresponds to six samples. Therefore, the repetition frequency of the frame is calculated as 7.35 kHz (i.e., sampling frequency of 44.1 kHz÷6=7.35 kHz). Further, a synchronizing signal (24 bits), subcode information (1 byte), etc. are added to the frame. Thus, each frame consists of 588 bits. Audio data recorded on the audio CD are normally derived by CIRC-encoding and then EFM-modulating such frame data.

The above-mentioned subcode information, which is additional information intended to permit efficient music reproduction from the audio CD, represents an identification number, index, time length (duration), etc. of the music piece in question; in some case, texts, graphics, etc. are also defined by the subcode information. Although one-byte subcode data can be incorporated per frame (7.35 kHz), a subframe is composed of 98 frames so that one block of subcode information is made up of 98 bytes, with a view to inserting a variety of items of information as noted above. The 98 frames are called a "sector", and therefore the repletion frequency of the sector (subcode frame) is calculated as 75 Hz (7.35 kHz/98). Bits of one byte added to each frame as the subcode information are called P, Q, R, S, T, U, V and W channels, respectively, and information of different contents is written in each of these channels. For example, the total number of tracks (recorded music pieces), track numbers (music piece numbers), time information, emphasis information, etc. are written in the Q channel.

Formats defined by the other standards are similar to the format of the CD-DA standard in that each audio signal is divided into sectors (frames) and the subcode information is embedded per sector.

Figure 5:
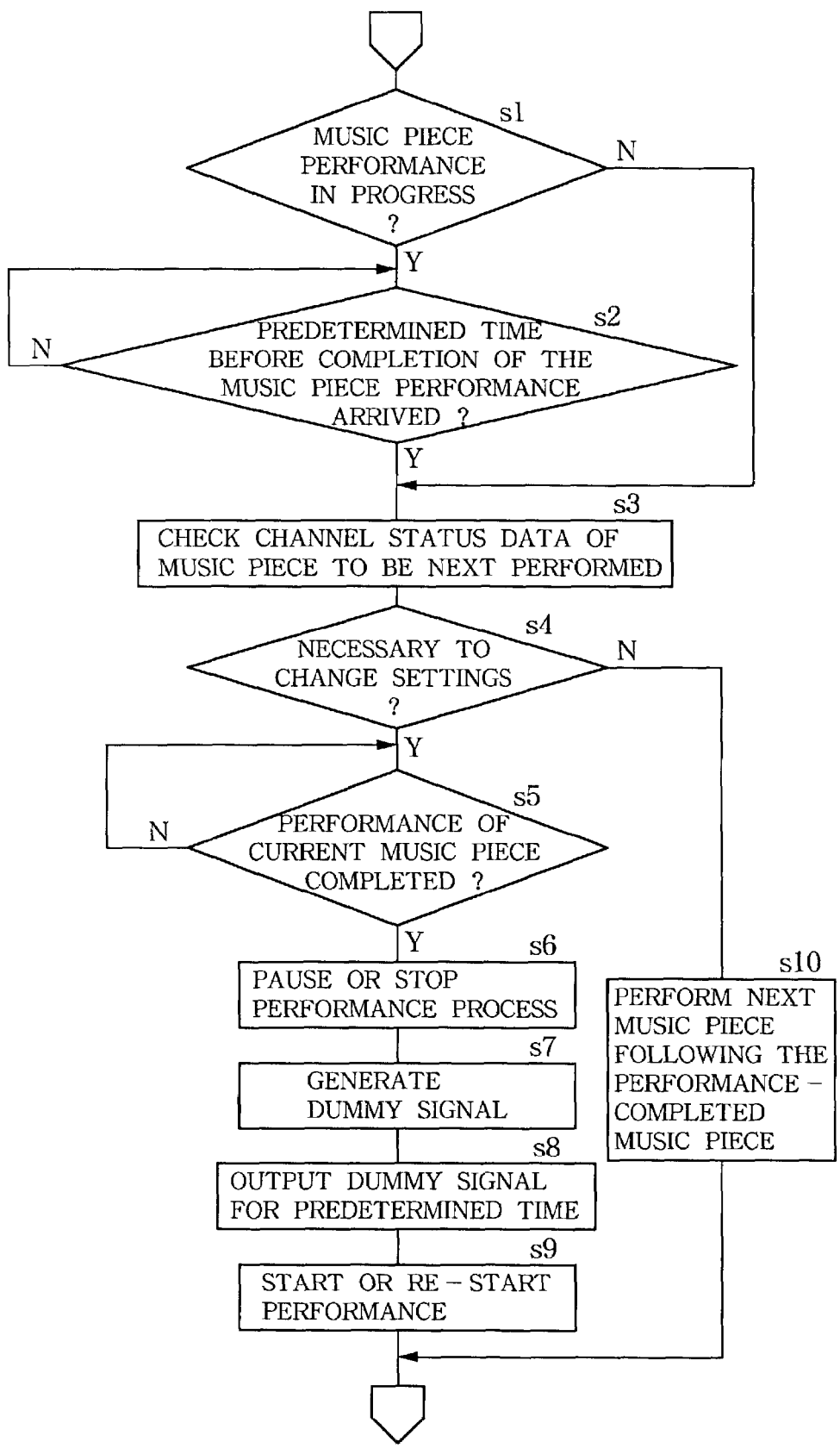
FIG. 5 is a flow chart explanatory of reproduction processing carried out by the digital audio signal recording/reproducing apparatus of FIG. 1.

FIG. 5 is a flow chart explanatory of reproduction processing carried out by the digital audio signal recording/reproducing apparatus of FIG. 1. This reproduction processing is executed when there is a reservation for reproduction of a music piece. When an audio CD is to be reproduced, all the tracks of the audio CD are first sequentially reserved for reproduction and then reproduced up to the last track. If reproduction of some music piece is currently in progress as determined at step s1, the reproduction processing waits at step s2 until a predetermined time before completion of the music piece reproduction arrives. Once such a predetermined time arrives, the reproduction processing proceeds to step s3. If, on the other hand, no music piece is being currently reproduced as determined at step s1, the reproduction processing proceeds directly to step s3 without taking step s2.

At step s3, channel status data are checked which constitute recording characteristic information of the music piece reserved for reproduction. If the channel status data of the reserved music piece are different from those of the currently-reproduced music piece, or if the channel status data of the reserved music piece are different from the default status settings in the case where no music piece is being currently reproduced, it is determined at step s4 that there is a need to change the current settings, in response to determination at step4, the display processing moves on to step s5. If, on the other hand, it is determined at step s4 that there is no need to change the current settings, the display processing jumps from step s4 to step s10, where reproduction of the reserved music piece is executed immediately after completion of the currently-reproduced music piece ("track 3"→"track 4" in the illustrated example of FIG. 3).

If the settings are to be changed as determined at step s4, the reproduction processing waits until the reproduction of the current music piece is completed. Once the reproduction of the current music piece is completed, the reproduction processing pauses (or stops) readout of the new music piece at step s6, then generates dummy data, having duration in the 500 msec.-1 sec. range, to change the channel status (step s7) and then outputs the generated dummy data (step s8). After that, the reproduction of the new music piece is initiated (i.e., the pause of the readout is canceled), at step s9.

At step s3, the audio signal may be read into the FIFO memory 3 at the same time that the channel status data are checked; alternatively, the operation for checking the channel status data alone may be performed here. Further, at step s6, the audio signal may continue to be read out from the CD drive 4 or hard disk 5 and then stored in a buffer memory; in this case, it suffices to stop output from the buffer.

Furthermore, the reproduction processing of FIG. 5 can apply to both of the case where an audio signal is output via the digital audio interface 22 and the case where an audio signal is output via the analog audio interface 23 after the D/A conversion.

Moreover, whereas the embodiment has been described above in relation to various examples of recording characteristics, such as the recording format of the CD-DA standard, DAT standard or DVD standard, ON/OFF setting of emphasis and sampling rate, the principles of the present invention are applicable to all cases where there occurs a variation in any characteristic that requires a change in settings of signal processing.

In summary, the present invention can appropriately reproduce an audio file without involving an unwanted lack in a file's head portion even where a plurality of digital audio files having different recording characteristics are to be reproduced in succession or where a digital audio file different from a default setting is to be reproduced.

What is claimed is:

1. A digital audio signal reproducing apparatus comprising:
    a storage device storing a plurality of digital audio files and characteristic information indicative of recording characteristics of individual ones of the digital audio files; and
    a control device that successively reads out the plurality of digital audio files and outputs the read-out digital audio files as digital audio signals,
    wherein when, after completion of output of a first digital audio signal corresponding to a first recording characteristic, shifting to output of a second digital audio signal corresponding to a second recording characteristic different from said first recording characteristic, said control device outputs, for a predetermined time, a silent digital audio signal having said second recording characteristic, based on second characteristic information, ahead of said second digital audio signal, and starts outputting said second digital audio signal corresponding to said second recording characteristic after having outputted said silent digital audio signal for the predetermined time.

2. A digital audio signal reproducing apparatus comprising:
    a storage device storing a plurality of digital audio files and characteristic information indicative of recording characteristics of individual ones of the digital audio files; and
    a control device that successively reads out the plurality of digital audio files and outputs the read-out digital audio files as digital audio signals, wherein
    when, after completion of output of a first digital audio signal corresponding to a first recording characteristic, shifting to output of a second digital audio signal corresponding to a second recording characteristic different from said first recording characteristic, said control device outputs, for a predetermined time, a silent digital audio signal having said second recording characteristic, based on second characteristic information, ahead of said second digital audio signal, and starts outputting said second digital audio signal corresponding to said second recording characteristic after having outputted said silent digital audio signal for the predetermined time, and when, after the output of said second digital audio signal corresponding to said second recording characteristic, shifting to output of a third digital audio signal corresponding to a third recording characteristic equal to said second recording characteristic, said control device starts outputting said third digital audio signal without outputting a silent digital audio signal having said third recording characteristic based on third characteristic information.

3. A digital audio signal reproducing apparatus as claimed in claim 1 wherein said silent digital audio signal is generated by said control device.

4. A digital audio signal reproducing apparatus as claimed in claim 3 wherein said second recording characteristic contained in said silent digital audio signal is recorded as channel status information.

5. A digital audio signal reproducing apparatus as claimed in claim 1 wherein each of the recording characteristics relates to at least one of settings of emphasis to be imparted to the digital audio signal or a sampling rate of the digital audio signal.

6. A digital audio signal reproducing method for use with a digital audio signal reproducing apparatus which successively reads out a plurality of digital audio files stored in a storage device and outputs each of the read-out digital audio files as a digital audio signal, said digital audio signal reproducing method comprising:

a step of outputting a first digital audio signal corresponding to a first recording characteristic;

a step of, when shifting to output of a second digital audio signal corresponding to a second recording characteristic different from said first recording characteristic after output of said first digital audio signal, outputting, for a predetermined time, a silent digital audio signal having said second recording characteristic, based on second characteristic information stored in said storage device, ahead of said second digital audio signal;

a step of starting outputting said second digital audio signal based on said second characteristic information after said silent audio signal has been output for the predetermined time; and a step of, when shifting to output of a third digital audio signal corresponding to a third recording characteristic equal to said second recording characteristic after the output of said second digital audio signal corresponding to said second recording characteristic, outputting said third digital audio signal without outputting a silent digital audio signal having said third recording characteristic based on third characteristic information.

7. A digital audio signal reproducing method for use with a digital audio signal reproducing apparatus which reads out digital audio files stored in a storage device and outputs the read-out digital audio files as a digital audio signal, said digital audio signal reproducing method comprising:

step of outputting a first digital audio signal corresponding to a first recording characteristic:

a step of, when shifting to the output of a second digital audio signal corresponding to a second recording different from said first recording characteristic after output of said first digital audio signal, outputting, for a predetermined time, a silent digital audio signal having said second recording characteristic, based on second characteristic information stored in said storage device, ahead of said digital audio signal; and a step of starting outputting said second digital audio signal based on said second characteristic information after said silent digital audio signal has been outputted for the predetermined time.

8. A digital audio signal reproducing apparatus comprising:

a storage device storing a plurality of digital audio files and characteristic information indicative of recording characteristics of individual ones of the digital audio files; and a control device that successively reads out the plurality of digital audio files and outputs the read-out digital audio files as digital audio signals, wherein the digital audio signals are sequentially separated and outputted independently starting with a first digital audio signal corresponding to a first recording characteristic, while said first digital audio signal corresponding to said first recording characteristic is output, said characteristic information stored in said storage device about a second digital audio signal corresponding to a second recording characteristic is recognized by said control device, and said control device determines whether a setting change is necessary, if said control device determines that said setting change is necessary, then after completion of the output of said first digital audio signal corresponding to said first recording characteristic, shifting to output of said second digital audio signal corresponding to said second recording characteristic different from said first recording characteristic, said control device outputs, for a predetermined time, a silent digital audio signal having said second recording characteristic, based on second characteristic information, ahead of said second digital audio signal, and starts outputting said second digital audio signal corresponding to said second recording characteristic after having outputted said silent digital audio signal for the predetermined time, and if said control device determines that said setting change is unnecessary, then said second digital audio signal corresponding to said second recording characteristic is output by said control device immediately after completion of said first digital audio signal.

* * * * *